US 11,648,965 B2

United States Patent
Cunningham et al.

(10) Patent No.: US 11,648,965 B2
(45) Date of Patent: May 16, 2023

(54) METHOD AND SYSTEM FOR USING A REACTION OF OTHER ROAD USERS TO EGO-VEHICLE ACTIONS IN AUTONOMOUS DRIVING

(71) Applicant: Argo AI, LLC, Pittsburgh, PA (US)

(72) Inventors: Christopher Cunningham, Pittsburgh, PA (US); Neal Seegmiller, Pittsburgh, PA (US); Mark Ollis, Pittsburgh, PA (US); Andrew T. Hartnett, West Hartford, CT (US); G. Peter K. Carr, Allison Park, PA (US); Constantin Savtchenko, Sewickley, PA (US)

(*) Notice: Subject to any disclaimer, the term of this patent is extended or adjusted under 35 U.S.C. 154(b) by 69 days.

(21) Appl. No.: 17/034,366

(22) Filed: Sep. 28, 2020

(65) Prior Publication Data

US 2022/0097732 A1  Mar. 31, 2022

(51) Int. Cl.
*B60W 60/00* (2020.01)
*G01C 21/34* (2006.01)
*B60W 30/09* (2012.01)

(52) U.S. Cl.
CPC ........ *B60W 60/0027* (2020.02); *B60W 30/09* (2013.01); *G01C 21/3453* (2013.01); *B60W 2420/42* (2013.01); *B60W 2420/52* (2013.01)

(58) Field of Classification Search
CPC ............ B60W 60/0027; B60W 30/09; B60W 2420/42; B60W 2420/52; B60W 50/0097; B60W 2554/40; B60W 2554/4041; B60W 2554/801; B60W 2554/802; B60W 2556/55; B60W 60/0011; B60W 60/0015; G01C 21/3453
See application file for complete search history.

(56) References Cited

U.S. PATENT DOCUMENTS

| | | |
|---|---|---|
| 9,120,484 B1 | 9/2015 | Ferguson et al. |
| 9,248,834 B1 | 2/2016 | Ferguson et al. |
| 9,630,318 B2 | 4/2017 | Ibarz Gabardos et al. |
| 9,669,827 B1 | 6/2017 | Ferguson et al. |
| 10,055,850 B2 | 8/2018 | Piekniewski et al. |

(Continued)

FOREIGN PATENT DOCUMENTS

| | | |
|---|---|---|
| JP | 2019167091 A | 10/2019 |
| KR | 20180128670 A | 12/2018 |

OTHER PUBLICATIONS

U.S. Appl. No. 16/425,132, filed May 29, 2019, Methods and Systems for Trajectory Forecasting With Recurrent Neural Networks Using Inertial Behavioral Rollout.

(Continued)

*Primary Examiner* — James J Lee
*Assistant Examiner* — Alexander George Matta
(74) *Attorney, Agent, or Firm* — Fox Rothschild LLP

(57) ABSTRACT

A method of determining a trajectory for an autonomous vehicle is disclosed. An ego-vehicle may detect a moving actor in an environment. To choose between candidate trajectories for the ego-vehicle, the system will consider the cost of each candidate trajectory to the moving actor. The system will use the candidate trajectory costs for the candidate trajectories to select one of the candidate trajectories via which to move the ego-vehicle. An autonomous vehicle system of the ego-vehicle may then move the ego-vehicle in the environment along the selected trajectory.

18 Claims, 8 Drawing Sheets

(56) References Cited

U.S. PATENT DOCUMENTS

| | | |
|---|---|---|
| 11,131,993 B2 | 9/2021 | Singh et al. |
| 2013/0054106 A1 | 2/2013 | Schmudderich et al. |
| 2015/0142207 A1 | 5/2015 | Flehmig et al. |
| 2017/0036675 A1 | 2/2017 | Neads |
| 2017/0323249 A1 | 11/2017 | Khasis |
| 2018/0053108 A1 | 2/2018 | Olabiyi et al. |
| 2018/0158197 A1 | 6/2018 | Dasgupta et al. |
| 2018/0173240 A1 | 6/2018 | Fang et al. |
| 2018/0304889 A1 | 10/2018 | Shalev-Shwartz et al. |
| 2018/0321686 A1 | 11/2018 | Kanzawa et al. |
| 2018/0321689 A1 | 11/2018 | Lehmann et al. |
| 2018/0329428 A1 | 11/2018 | Nagy et al. |
| 2018/0374359 A1 | 12/2018 | Li et al. |
| 2019/0025841 A1* | 1/2019 | Haynes ................. B60W 30/00 |
| 2019/0049970 A1 | 2/2019 | Djuric et al. |
| 2019/0049987 A1 | 2/2019 | Djuric et al. |
| 2019/0071124 A1 | 3/2019 | Carter et al. |
| 2019/0086924 A1 | 3/2019 | Greenfield et al. |
| 2019/0286151 A1 | 9/2019 | Palanisamy et al. |
| 2019/0354105 A1 | 11/2019 | Cunningham |
| 2020/0159225 A1 | 5/2020 | Zeng et al. |
| 2020/0172093 A1 | 6/2020 | Kum et al. |
| 2021/0046924 A1* | 2/2021 | Caldwell .............. G05D 1/0088 |
| 2021/0056713 A1 | 2/2021 | Rangesh et al. |
| 2021/0114617 A1* | 4/2021 | Phillips ............. B60W 30/0956 |

OTHER PUBLICATIONS

U.S. Appl. No. 17/373,090, filed Jul. 12, 2021, Methods and Systems for Trajectory Forecasting With Recurrent Neural Networks Using Inertial Behavioral Rollout.

U.S. Appl. No. 17/373,090, filed Jul. 21, 2021, Methods and Systems for Trajectory Forecasting With Recurrent Neural Networks Using Inertial Behavioral Rollout.

Levinson, Jesse et al., "Towards Fully Autonomous Driving: Systems and Algorithms", 2011 IEEE Intelligent Vehicles Symposium (IV), Jun. 5-9, 2011.

Galceran, Enric et al., "Augmented Vehicle Tracking under Occlusions for Decision-Making in Autonomous Driving", 2015 IEEE/RSJ International Conference on Intelligent Robots and Systems (IROS), Sep. 2015.

Chang, Ming-Fang et al., "Argoverse: 3D Tracking and Forecasting with Rich Maps", Jun. 19, 2019.

Lee, Namhoon et al., DESIRE: Distant Future Prediction in Dynamic Scenes with Interacting Agents, Computer Science: Computer Vision and Pattern Recognition, Apr. 14, 2017.

Deo, N. et al., "Convolutional Social Pooling for Vehicle Trajectory Prediction", cs.CV, May 15, 2018.

Bansal, Mayank et al., "ChauffeurNet: Leaning to Drive by Imitating the Best and Synthesizing the Worst", Computer Science: Robotics, Dec. 7, 2018.

Casas, Sergio et al., "IntentNet: Learning to Predict Intention from Raw Sensor Data", Proceedings of the 2nd Conference on Robot Learning, PMLR 87:947-956, 2018.

Yao, Yu. et al., "Egocentric Vision-Based Future Vehicle Localization for Intelligent Driving Assistance Systems," cs CV, Mar. 3, 2019.

Subosits, John et al., "From the Racetrack to the Road: Real-Time Trajectory Replanning for Autonomous Driving," IEEE Transactions on Intelligent Vehicles.

"Know Before You Go: 3D Tracking and Forecasting with Rich Maps," Anonymous CVPR Submission #4994, pp. 1-10.

Seo, Young-Woo et al., "Tracking and Estimation of Ego-Vehicle's State for Lateral Localization," IEEE 17th International Conference on Intelligent Transportation Systems, pp. 1251-1257, Oct. 2014.

Bhattacharyya et al. "Long-Term On-Board Prediction of People in Traffic Scenes under Uncertainty" arxiv.org, Cornell Univ Library, 201 Olin Library Cornell Unin Ithaca, NY, (2017), xp08083991.

Leibfried et al., "A Deep Learning Approach for Joint Video Frame and Reward Prediction in Atari Games", arvix.org, Cornell Univ Library, 201 Olin Library Cornell Univ Ithaca, NY (2016), xp080733531.

Yang et al., "Weakly-supervised Disentangling with Recurrent Transformation for 3D View Synthesis", arxiv.org, Cornell Univ Library, 201 Olin Library Cornell Univ Ithaca, NY (2016), xp080797763.

* cited by examiner

METHOD AND SYSTEM FOR USING A REACTION OF OTHER ROAD USERS TO EGO-VEHICLE ACTIONS IN AUTONOMOUS DRIVING

BACKGROUND

When an autonomous vehicle (AV) control system makes decisions about how and where to move the vehicle in an environment, a challenging problem is how to plan for possible interactions between the AV and other actors in the environment. The classical approach for considering other actors is to predict the trajectories that the other actor is planning to take. Then, in motion planning, the AV plans to avoid those trajectories by treating them as hard obstacles.

However, treating the future actions of other actors as hard boundaries to avoid in all situations is not ideal, as it can cause the AV to avoid locations in space and time that the other actor will not actually reach. It can also cause the AV to fail to consider other actions of the actor, such as how the actor may react to actions of the AV.

This document describes methods and systems that are directed to addressing the problems described above, and/or other issues.

SUMMARY

In various embodiments, a method of determining a trajectory for an autonomous vehicle is disclosed. To implement the method, a presence detection system of an ego-vehicle may detect the presence of a moving actor in an environment while the ego-vehicle is moving about the environment. A motion planning system of the ego-vehicle, another system of the ego-vehicle, or an external system may identify various candidate trajectories for the ego-vehicle. For each of the candidate trajectories of the ego-vehicle, the system may determine: (i) a reactive trajectory that the moving actor is expected to follow in reaction to the candidate trajectory of the ego-vehicle; (ii) a cost to the moving actor for the reactive trajectory, and (iii) a candidate trajectory cost for the candidate trajectory. The candidate trajectory cost will be a function of a cost to the moving actor for the candidate trajectory and one or more ego-centric factors. The system will use the candidate trajectory costs for the candidate trajectories to select one of the candidate trajectories via which to move the ego-vehicle. An autonomous vehicle system of the ego-vehicle may then move the ego-vehicle in the environment along the selected trajectory.

Optionally, using the candidate trajectory costs for the candidate trajectories to select one of the candidate trajectories may include selecting the candidate trajectory having the lowest candidate trajectory cost. Optionally, using the candidate trajectory costs for the candidate trajectories to select one of the candidate trajectories comprises selecting, from the candidate trajectories, a trajectory having a lowest cost to the moving actor.

Optionally, the system also may determine a nominal trajectory prediction that includes a nominal trajectory that the moving actor would be expected to follow in reaction to past actions of the ego-vehicle.

In various embodiments, the cost to the moving actor may be a function of a deviation of the reactive trajectory from the nominal trajectory. In addition or alternatively, the cost to the moving actor may be a function of either or both of the following: (i) severity of a control action associated with the reactive trajectory; or (ii) how close the reactive trajectory will come to the candidate trajectory.

Optionally, determining the reactive trajectory that the moving actor is expected to follow in reaction to the candidate trajectory of the ego-vehicle may include: (i) determining possible reactive trajectories that the moving actor may follow in reaction to the candidate trajectory; (ii) determining a reactive trajectory cost for each of the possible reactive trajectories; and (iii) selecting, as the reactive trajectory that the moving actor is expected to follow, the possible reactive trajectory having the lowest reactive trajectory cost.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Definitions for additional terms that are relevant to this document are included at the end of this Detailed Description.

This document describes an approach by which an autonomous vehicle (AV) will identify, score and use interactions with other movers in an environment, and then use the result to make decisions about when and where the AV will move. This document may refer to the AV that makes such decisions as an "ego-vehicle." This document may refer to detected moving or potentially-moving objects such as vehicles (cars, trucks, bicycles, etc.) and pedestrians as "moving actors." A goal of the ego-vehicle that uses the methods described in this document is to avoid moving along a trajectory that would make another moving actor to react in a way that would cause the moving actor to take an aggressive move, or a move that would be uncomfortable to riders of the moving actor (such as a sharp, sudden turn or a hard braking event). The approach considers various candidate trajectories of the ego-vehicle, determines a cost to the moving actor for each of those trajectories, and it penalizes candidate trajectories that would result in a high cost to the moving actor. The cost determination is a continuous process that allows the ego-vehicle to choose between two or more candidate actions, even if neither is an ideal action, should the need arise.

Figure 1:
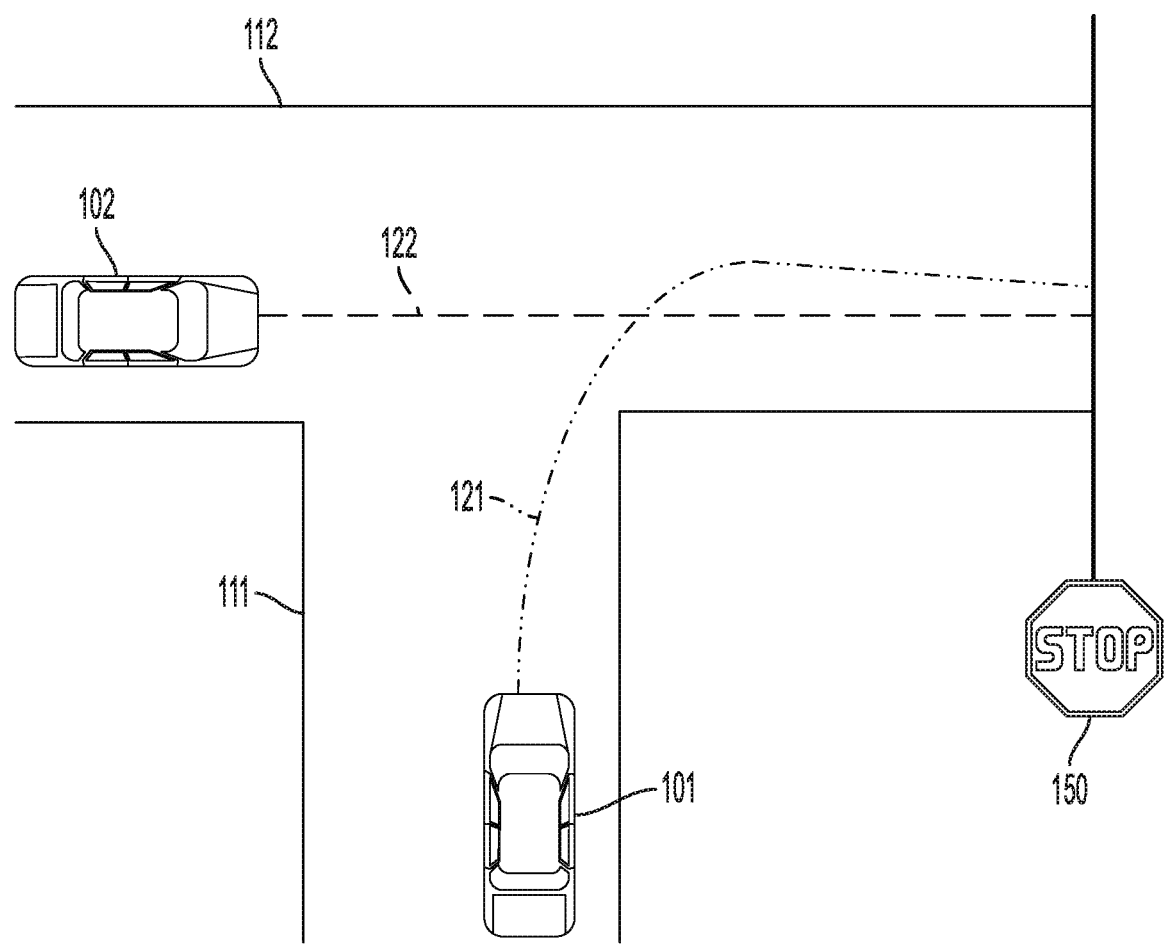
FIG. 1 illustrates an example of an interaction between an autonomous vehicle (AV) and another moving actor in an environment.

Consider the example shown below in FIG. 1, in which an ego-vehicle 101 is driving in a first street 111 and is about to turn onto a second street 112. The ego-vehicle's sensors detect a moving actor 102 (in this case, another vehicle) in the second street 112, moving toward the intersection between the first and second streets 111, 112. (Methods by which the ego-vehicle's sensor may detect a moving actor will be described below.) Both the ego-vehicle 101 and the moving actor 102 are approaching a stop sign 150 on the second street 112. A planned trajectory 121 of the ego-vehicle 101 and a predicted trajectory 122 of the moving actor 102 suggest that the ego-vehicle 101 and the moving actor 102 could collide. In this case, if the ego-vehicle 101 were not an AV but instead were operated by a human driver, the human driver might choose to proceed, expecting that the moving actor 102 would slow and yield. However, an AV's motion planning system may wait because a plan to move along the trajectory 121 may be too risky.

Figure 2:
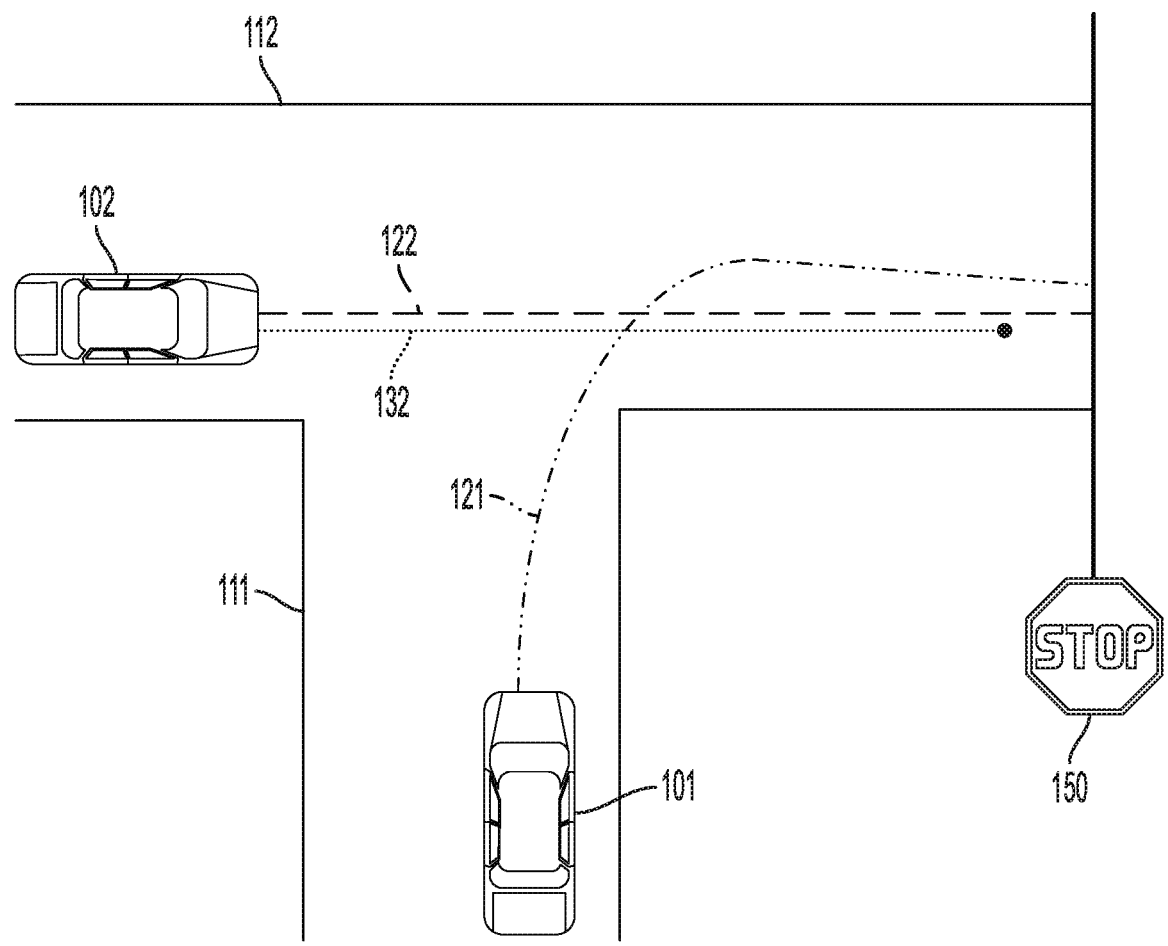
FIG. 2 illustrates another example of an interaction between an AV and another moving actor in an environment, in which the moving actor decelerates in reaction to movement of the AV.

To address this, the ego-vehicle of the present disclosure may forecast both a nominal trajectory and a reactive trajectory for a detected moving actor. Referring to FIG. 2, the expected trajectory 122 of the moving actor 102 is considered to be a nominal trajectory, as it is a trajectory that the ego-vehicle 101 forecasts based on sensed data about the moving actor 102 (such as past movements of the moving actor 102), based on past actions of the ego vehicle 101, and/or of the environment (such as weather, other actors in the scene, etc.). However, in this case the ego-vehicle 101 also forecasts a reactive trajectory 132 for the moving actor 102. The reactive trajectory 132 considers how the moving actor 102 may react to the ego-vehicle's planned future actions. The predicted nominal trajectory 122 and reactive trajectory 132 may be used together to determine how aggressive of the reaction the ego-vehicle 101 would cause the moving actor 102 to take, and how much that would inconvenience the moving actor's progress toward its predicted goal.

In the example shown in FIG. 2, instead of considering only the nominal trajectory 122 when deciding whether to proceed to turn right into the second street 112, the ego-vehicle also predicts and considers a reactive trajectory 132. In the example shown, the reactive trajectory 132 does not significantly limit the forward progress of the moving actor 102, nor does it cause the moving actor to take an aggressive control action. Therefore, the ego-vehicle's automated vehicle control system (AVS) may cause the ego-vehicle 101 to proceed to turn into the second street 112.

Figure 3:
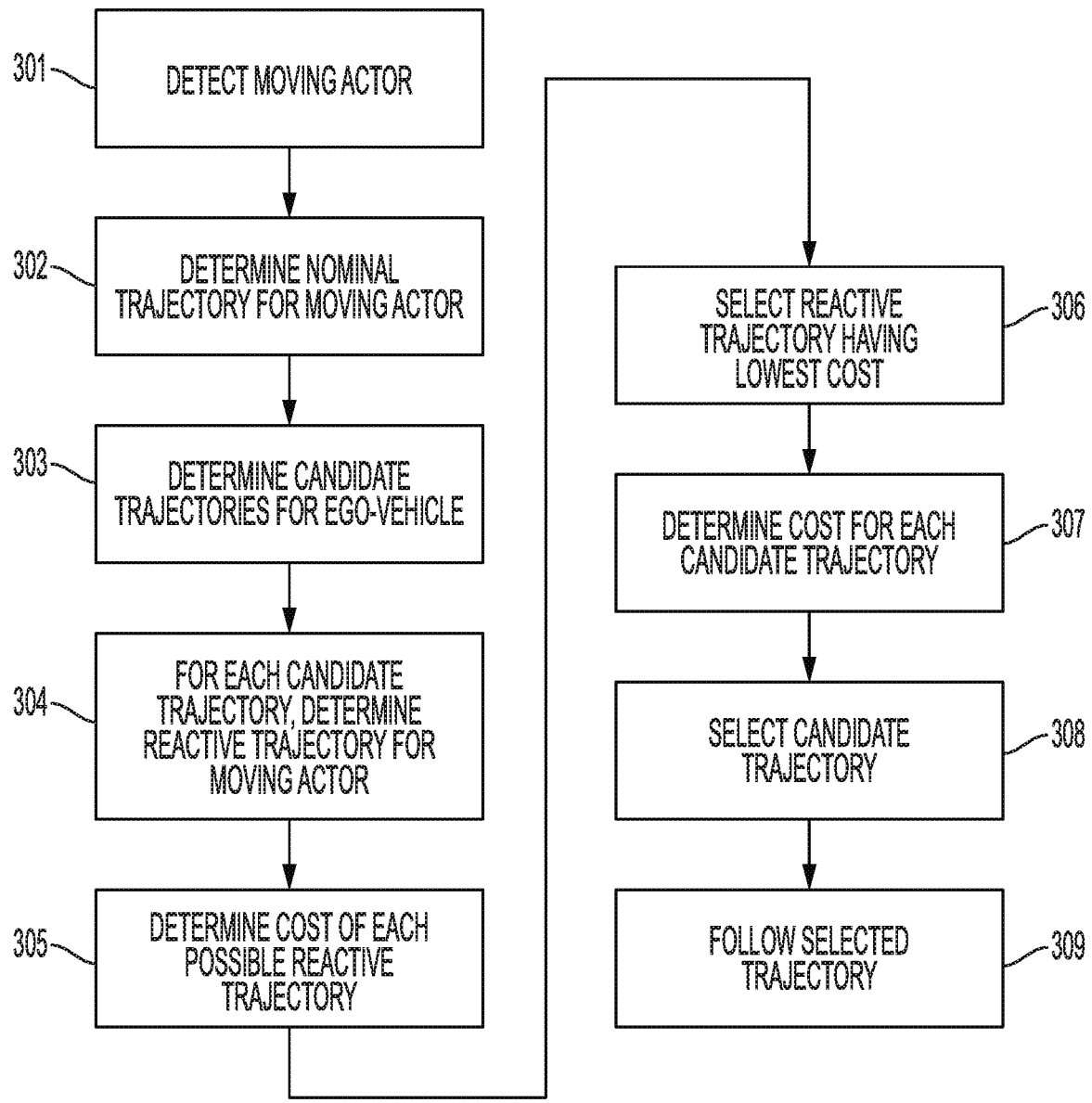
FIG. 3 illustrates an example process by which an AV may make decisions about how to move in an environment.

FIG. 3 describes various elements by which an AV may determine a trajectory for its movement in an environment. At 301, a presence detection system of an ego-vehicle may detect the presence of a moving actor in an environment while the ego-vehicle is moving within the environment, as discussed above in FIGS. 1 and 2. For example, the presence detection system may capture images of the moving actor and process the images using a classifier (i.e., a trained model) to identify the presence of an object and classify the object as a vehicle, bicycle, pedestrian or other moving actor. Other presence detection systems such as LiDAR sensors may be employed. The presence detection system may use any now or hereafter known object recognition algorithms, video tracking algorithms, and computer vision algorithms to identify the moving actor. For example, the system may use a bounding box to identify an object in a first frame and rack movement of the box frame-to-frame iteratively over a time period.

At 302 the presence detection system, a motion planning system of the ego-vehicle, an external system that is in communication with the ego-vehicle (such as an external server, a mobile electric device or a traffic node), or a combination of any of these may predict a nominal trajectory for the moving actor. The nominal trajectory prediction will include a nominal trajectory that the moving actor would be expected to follow, optionally considering past actions of the ego-vehicle. The nominal trajectory represents a smooth path that does not have abrupt changes that would otherwise provide passenger discomfort. Techniques for determining a vehicle trajectory are well known in the art, and any known or to be known technique for determining a vehicle trajectory can be used. Example trajectory forecasting algorithms are disclosed in, for example, Chang et al. "Argoverse: 3D tracking and Forecasting with Rich Maps", published Nov. 6, 2019 at https://arxiv.org/abs/1911.02620, and include algorithms such as Social-LSTM, Social-GAN, INtentNet, DESIRE, R2P2 and PRECOG, among other algorithms. These algorithms may, in some embodiments, use as an input past actions of the ego-vehicle to predict the trajectory for the moving actor. For example, if the ego-vehicle's past actions demonstrate an intent to move into the path of the moving actor, the trajectory of the moving vehicle may be in part reactive to the moving actor's expected action of the ego-vehicle.

At 303 the ego-vehicle's motion planning system will identify two or more candidate trajectories for the ego-vehicle. (Note that the position of step 303 after step 302 is optional; the order of steps 302 and 303 may be reversed in some implementations.) Each candidate trajectory will include a path and corresponding time elements by which the ego-vehicle will reach a target location from its present location. In generating a candidate trajectory, the ego-vehicle's motion planning may consider map data, detected objects, traffic signals and detected traffic signal states, or other aspects of the environment. For example, to determine a candidate trajectory the system may determine which lanes are available for the ego-vehicle to reach the target. Each such lane may be considered to be a path along which the trajectory will follow. The system may then apply various speeds to each path to select candidate trajectories, some of which reach the target relatively quicker, and some relatively slower, than others.

For each candidate trajectory, at 304 the ego-vehicle's motion planning system will determine a reactive trajectory that the moving actor is expected to follow in reaction to the candidate trajectory of the ego-vehicle. By way of example, the system may use a parameterized motion model that is a longitudinal model to predict the reaction of the moving actor to the AV. Referring to the scenarios of FIGS. 1 and 2, just as the ego-vehicle has a choice of whether to turn into the path of the moving actor, the moving actor has the choice of whether to accelerate and pass the ego-vehicle or slow and queue behind it. Thus, the moving actor may have a choice between several possible reactive trajectories. The ego-vehicle's motion planning system may therefore assume that the mover is behaving optimally or rationally with respect to some cost function, and that when faced with a choice (such as accelerate and pass, or slow and queue behind) the moving actor will choose the reactive trajectory having the relatively lower cost.

At 305, the system may use any suitable cost function to determine the cost of each possible reactive trajectory. For example, if the set of actions that the moving actor may take in the example described above are considered to be A{Pass, Queue}, Cost(a) may be the cost that the moving actor incurs by taking action a. The system may then presume that the moving actor will select the action that optimizes the equation $\mathrm{argmin}_a$ Cost(a), a∈A. Essentially, if it is a lower cost to slow and queue, the system will predict that the moving actor will do so; if it is a lower cost to accelerate and pass, the system will predict that the moving actor will do so. (Note: the example cost function described above is only by way of example, other cost functions, including but not limited to functions more complex than the simple example above, may be used).

By way of example, the reaction of the moving actor to the ego-vehicle may be framed as a one-parameter problem or a multi-parameter problem. In a one-parameter problem, the parameter may be deceleration of the moving actor, expecting that the moving actor will decelerate until either the ego-vehicle is no longer in the moving actor's path or the moving actor has matched the speed of the ego-vehicle. A multi-parameter problem may include deceleration as described above, and one or more other parameters such as the time at which the ego-vehicle and moving actor's speeds match.

Figure 4:
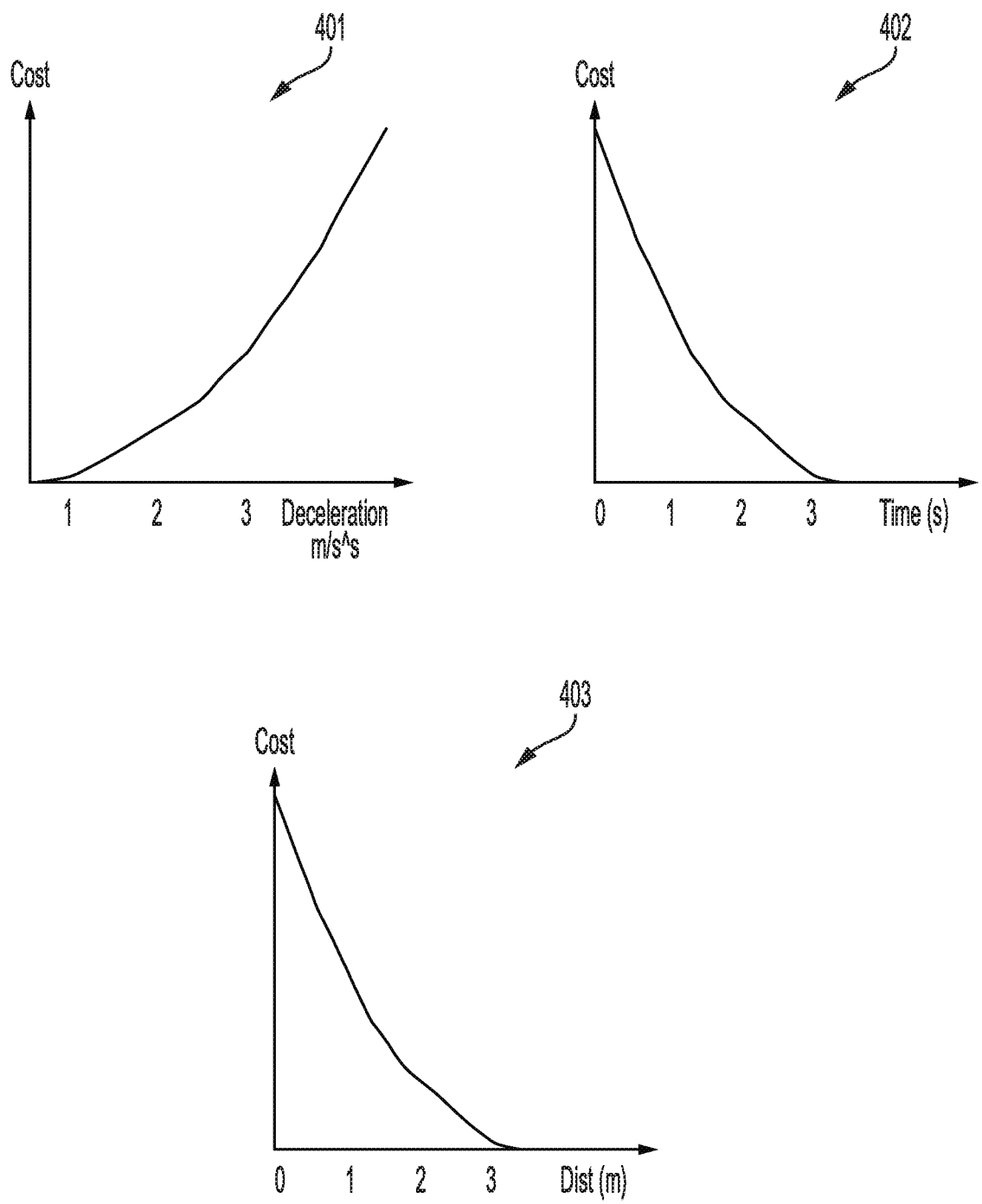
FIG. 4 illustrates how costs associated with various moving actions may be defined when the moving actor decelerates in reaction to actions of an AV.

In this example, the cost that the ego-vehicle will expect the moving actor will try to optimize may be a function of deceleration (assuming that the moving actor will prefer to minimize deceleration—more severe deceleration will be less preferred), following time (i.e., the distance between the moving actor and the closest point of the ego-vehicle divided by the moving actor's current velocity—assuming that the moving actor will prefer to maximize following time), following distance (assuming that the moving actor will prefer to maximize following distance, and avoid coming too close to the ego-vehicle), and mover type (as different types of actors—cars, busses, ambulances, bicycles, etc.—may have different cost function parameters). Other parameters, or subsets of these parameters, may be used. Cost functions could be defined as polynomials, piecewise linear functions, sigmoids or other functions. FIG. 4 illustrates example costs associated with deceleration 401, following time 402 and following distance 403. The overall cost that the moving actor may thus be trying to minimize is:

$$\mathrm{Cost} = \max_t(\mathrm{FollowingTimeCost}_t) + \max_t(\mathrm{FollowingDistCost}_t) + \mathrm{DecelCost}_t$$

In this equation, the max represents the max over all timesteps (t) for which the system has sampled distances.

Figure 5:
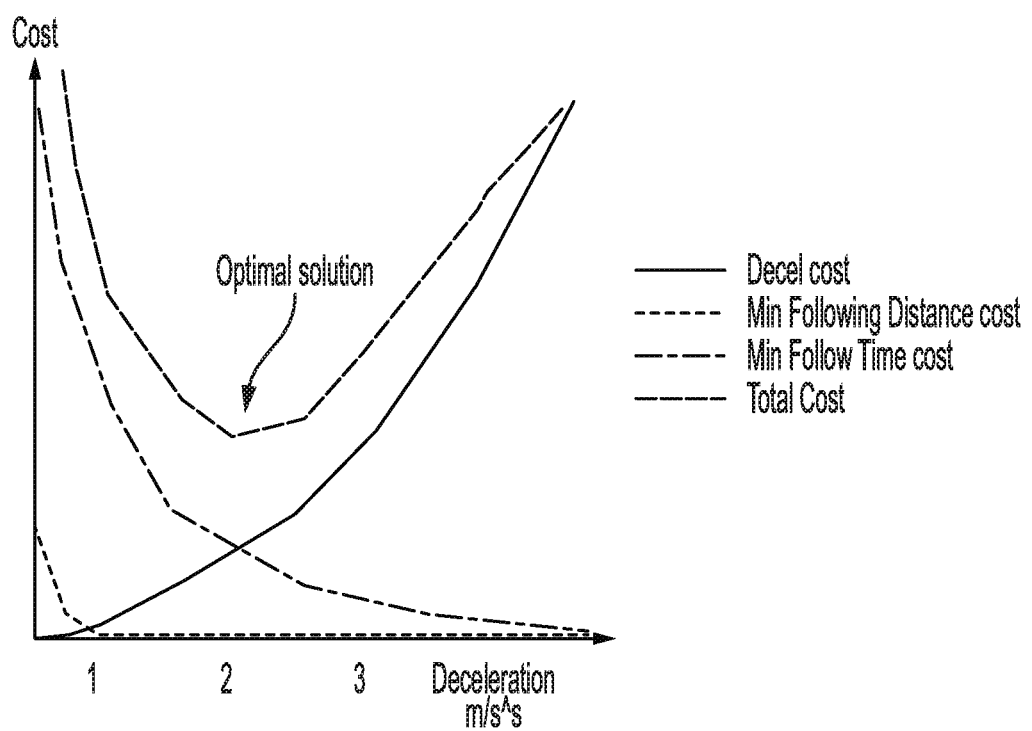
FIG. 5 illustrates an example total cost determination for a particular reactive trajectory of a moving actor that includes deceleration.

The combined cost function may look like that illustrated in FIG. 5, where the total cost is the sum of all other cost components. The cost may therefore vary as a function of how much the reactive trajectory deviates from the nominal trajectory in space, time or both.

This assumes that the moving actor behaves "optimally" with respect to the cost function and will follow the possible reactive trajectory having the lowest cost (step 306 in FIG. 3).

Figure 6:
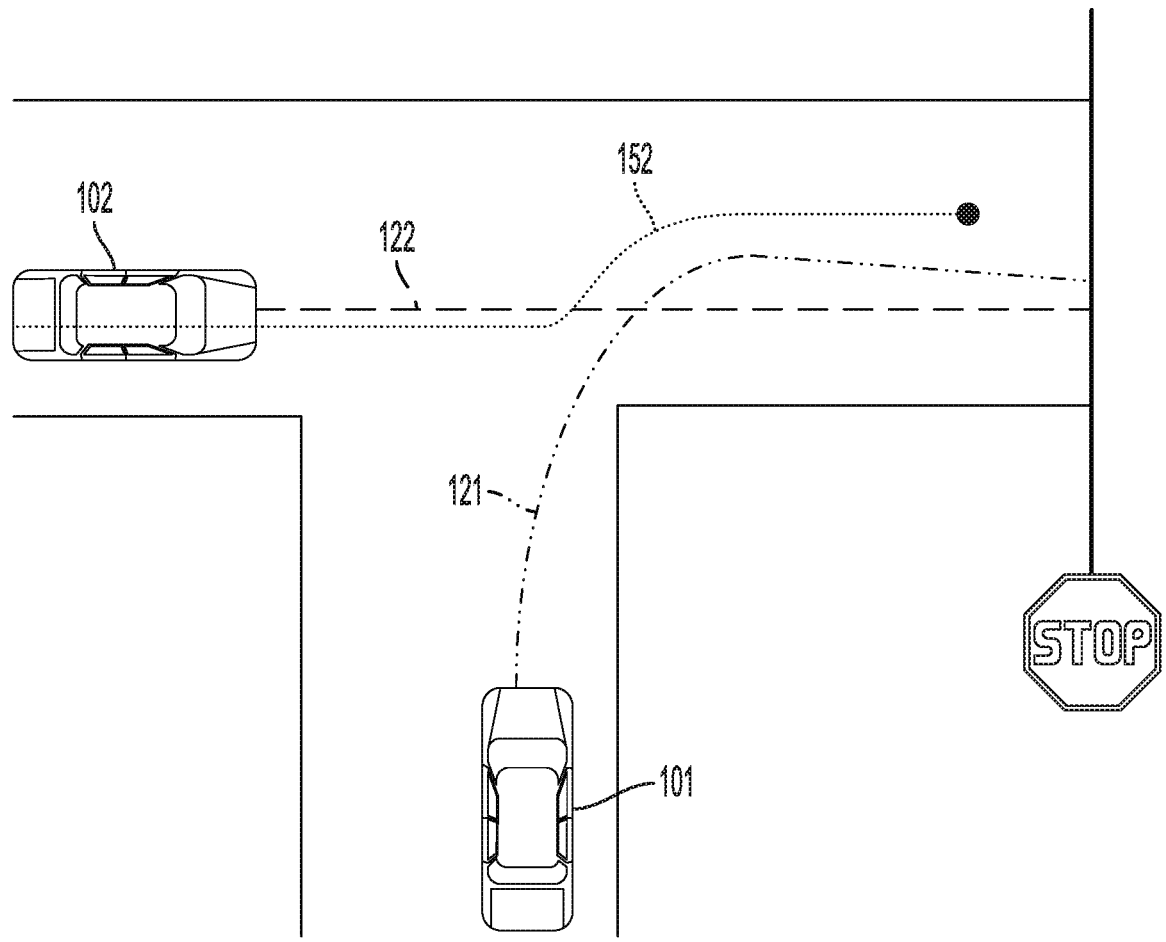
FIG. 6 illustrates another example of an interaction between an AV and another moving actor in an environment, in which the moving actor veers into a passing lane in response to actions of the AV.

As an additional example, consider a situation in which a possible reactive trajectory of the moving actor is to pass the ego-vehicle. This is shown in FIG. 6. The ego-vehicle 101, moving actor 102, candidate trajectory 121 and nominal trajectory 122 are the same as was the case in FIG. 1. However, the reactive trajectory 152 of the moving actor 102 now assumes that the moving actor 102 will veer to avoid the ego-vehicle 101.

Instead of a single parameter, in this situation the reactive trajectory may have at least two degrees of freedom. The model assumes that the moving actor 102 will continue on its normal path for an initial period, then transition to a lateral offset from the nominal path, then maintain motion along the lateral offset. The two free parameters may include the lateral offset and another factor such as the distance along a curve that starts with the deviation from the nominal path and ends at the point where the moving actor returns to the nominal path.

Figure 7:
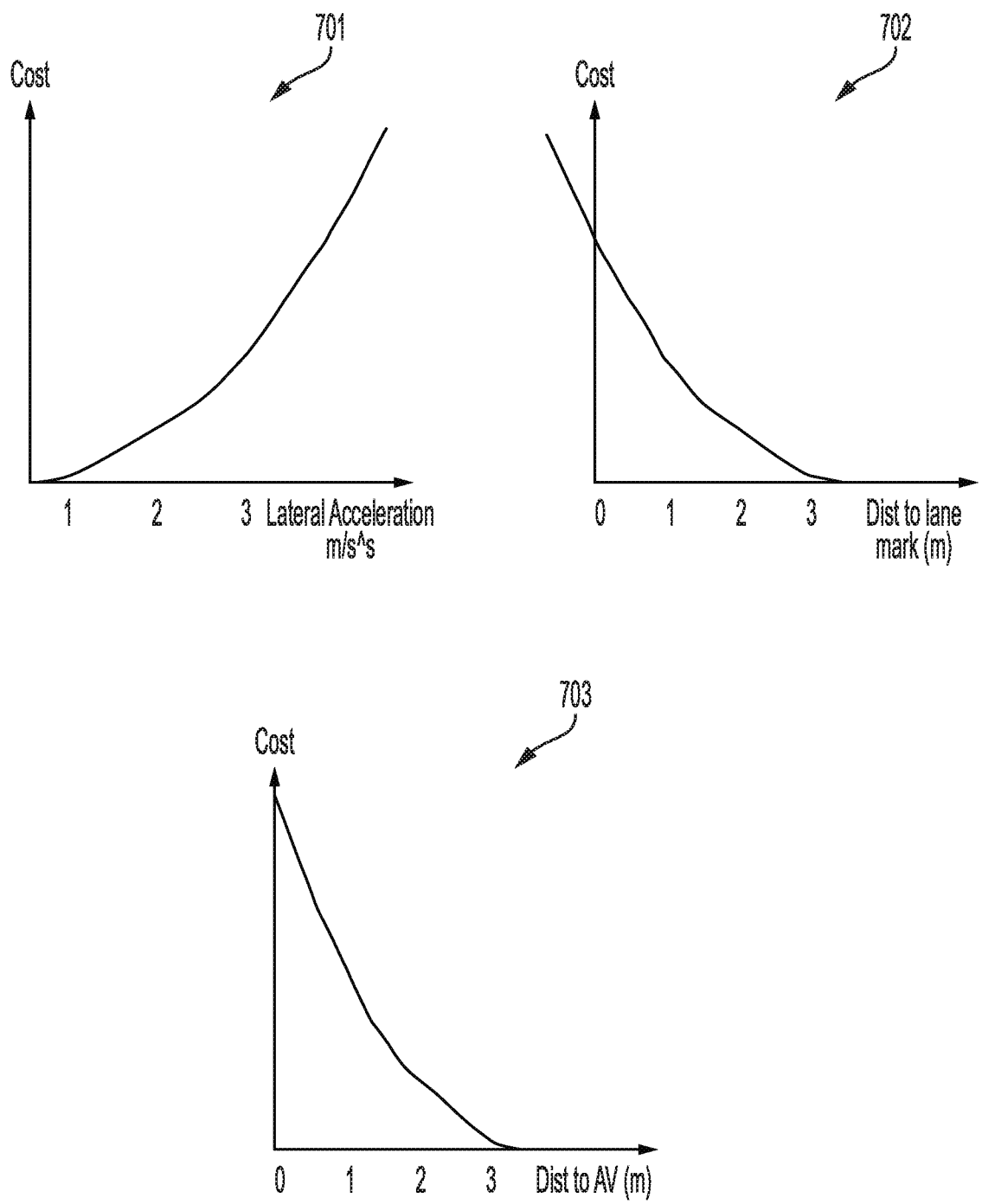
FIG. 7 illustrates how costs associated with various moving actions may be defined when the moving actor moves into a passing lane in reaction to actions of an AV.

In this example, the cost that the ego-vehicle will expect the moving actor will try to optimize is a function of lateral acceleration (assuming that the moving actor will prefer to minimize acceleration—more severe acceleration will be less preferred), lateral distance to a lane mark of the opposite lane (i.e., the distance between the moving actor and a lane mark—such as a centerline—of the passing lane into which the moving actor will move—assuming that the moving actor will prefer to maximize this distance), lateral distance to the ego-vehicle (assuming that the moving actor will prefer to maximize the lateral distance and avoid coming too close to the ego-vehicle), and mover type (as different types of actors—cars, busses, ambulances, bicycles, etc.—may have different cost function parameters). Other parameters, or subsets of these parameters, may be used. Cost functions could be defined as polynomials, piecewise linear functions, sigmoids or other functions. FIG. 7 illustrates example costs associated with lateral acceleration 701, distance to passing lane mark 702 and distance to the AV (ego-vehicle) 703. The overall cost that the moving actor may thus be trying to minimize is:

$$\mathrm{Cost} = \max_t(\mathrm{DistToAVCost}_t) + \max_t(\mathrm{DistToLaneMarkCost}_t) + \max_t(\mathrm{LatAccelCost})$$

In this equation, the max represents the max over all timesteps (t) for which the system has sampled distances.

Other parameters may be considered in the cost function. For example, the system may incorporate a penalty in the cost to account for uncertainty in measured parameters (such as initial velocity of the moving actor), and/or to account for uncertainty in the possible reactive trajectory. The cost may also consider other factors such as whether a particular action will cause the moving actor or another moving actor in the scene to violate one or more rules (such as traffic control rules, right of way rules, and the like).

Returning to FIG. 3, for each of the ego-vehicle's candidate trajectories, at 307 the ego-vehicle's motion planning system may determine a cost for the candidate trajectory. The candidate trajectory's cost is a function of the determined cost to the moving actor for that candidate trajectory, along with one or more ego-centric factors. The ego-centric factors may include factors such as intensity of deceleration or acceleration (higher values are less desirable and thus have higher cost), anticipated sharpness of a turn (higher values are less desirable and thus have higher cost), or other such as those described above for the reactive trajectory of the moving actor.

At 308 the system will use the determined candidate trajectory costs for the candidate trajectories to select one of the candidate trajectories via which to move the ego-vehicle. For example the system may simply select, from the candidate trajectories, the candidate trajectory having the lowest candidate trajectory cost. Alternatively, the system may select, from the candidate trajectory costs, that which is associated with the lowest cost to the moving actor. Other functions, including more complex functions using additional parameters, may be used.

At 309 an autonomous vehicle system of the ego-vehicle will cause the ego-vehicle to move in the environment along the selected trajectory. For example, the selected trajectory will have a particular path, and a speed at each point in the path. The autonomous vehicle system will cause the vehicle's steering system to direct the vehicle along the path, and the vehicle's acceleration or braking subsystems to move the ego-vehicle at the trajectory' speed at each point of the path.

Figure 8:
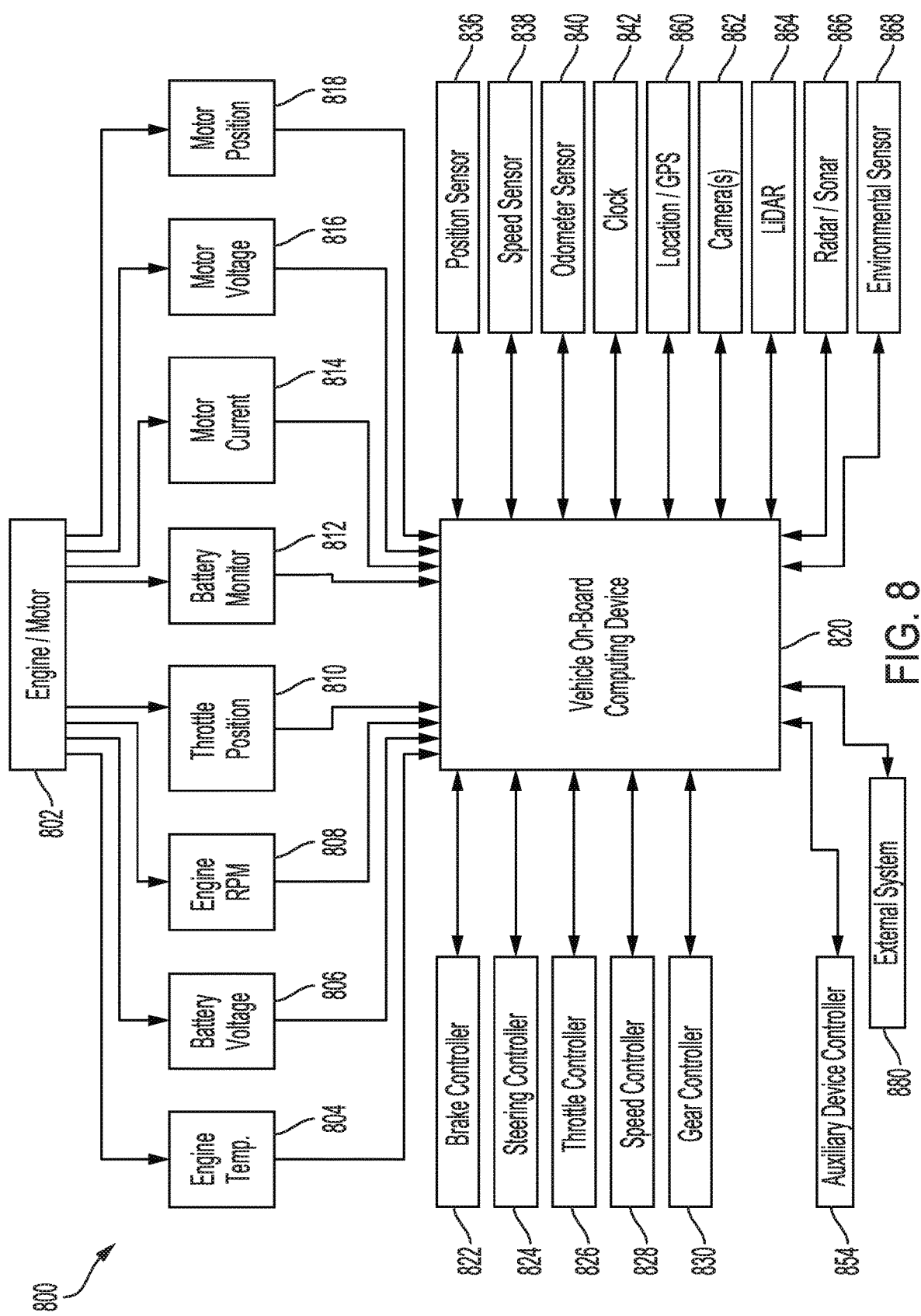
FIG. 8 illustrates example systems and components of an AV.

FIG. 8 illustrates an example system architecture 800 for a vehicle, such as an AV that is an ego-vehicle in the present embodiments. Ego-vehicle 101 of FIGS. 1 and 2 may have the same or similar system architecture as that shown in FIG. 2. Thus, the following discussion of system architecture 800 is sufficient for understanding ego-vehicle 101 of FIGS. 1 and 2.

As shown in FIG. 2, the vehicle includes an engine or motor 802 and various sensors 804-818 for measuring various parameters of the vehicle. In gas-powered or hybrid vehicles having a fuel-powered engine, the sensors may include, for example, an engine temperature sensor 804, a battery voltage sensor 806, an engine rotations per minute (RPM) sensor 808, and a throttle position sensor 810. If the vehicle is an electric or hybrid vehicle, then the vehicle may have an electric motor, and accordingly will have sensors such as a battery monitoring system 812 (to measure current, voltage and/or temperature of the battery), motor current 814 and temperature 816 sensors, and motor position sensors such as resolvers and encoders 818.

Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate as a presence detection system to gather information about the environment in which the vehicle is traveling. These sensors may include, for example: a location sensor 860 (e.g., a global positioning system (GPS) device); object detection sensors such as one or more cameras 862; a LiDAR sensor system 864; and/or a radar and or and/or a sonar system 866. The sensors also may include environmental sensors 868 such as a precipitation sensor and/or ambient temperature sensor. The object detection sensors may enable the vehicle to detect objects (such as moving actor 102 of FIGS. 1 and 2) that are within a given distance range of the vehicle 800 in any direction, while the environmental sensors collect data about environmental conditions within the vehicle's area of travel.

During operations, information is communicated from the sensors to an on-board computing device 820. The on-board computing device 820 also functions as part of the presence detection system to analyze the data captured by the sensors and optionally control operations of the vehicle based on results of the analysis. The on-board computing device will include one or more processors and one or more memory devices.

For example, the on-board computing device 820 may include programming that is configured to cause the processor to control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as LiDAR 864 is communicated from those sensors to the on-board computing device 820, with such elements being elements of a presence detection system of the vehicle. The object detection information and/or captured images are processed by the on-board computing device 820 to detect objects in proximity to the vehicle 800. Any known or to be known technique for making an object detection based on sensor data and/or captured images can be used in the embodiments disclosed in this document When the on-board computing device 820 detects a moving object, the on-board computing device 820 or a different on-board computing device, or an external system 880 such as a remote server or mobile electronic device, in each case functioning as a motion planning system, will generate one or more possible object trajectories for the detected object, and analyze the possible object trajectories to assess the risk of a collision between the object and the AV. If the risk exceeds an acceptable threshold, the on-board computing device 820 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 820 may cause the vehicle 800 to perform a cautious maneuver (e.g., mildly slow down, accelerate, or swerve). In contrast, if the collision cannot be avoided, then the on-board computing device 820 will cause the vehicle 800 to take an emergency maneuver (e.g., brake and/or change direction of travel).

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision-making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations discussed above.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" or "AV" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

The term "ego-vehicle" refers to a particular vehicle that is moving in an environment. When used in this document, the term "ego-vehicle" generally refers to an AV that is moving in an environment, with an autonomous vehicle control system (AVS) that is programmed to make decisions about where the AV will or will not move.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway, and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when relative terms of order such as "first" and "second" are used to modify a noun, such use is simply intended to distinguish one item from another, and is not intended to require a sequential order unless specifically stated.

The invention claimed is:

1. A method of determining a trajectory for an autonomous vehicle, the method comprising:
   by a presence detection system of an ego-vehicle, detecting presence of a moving actor in an environment while the ego-vehicle is moving about the environment;
   identifying a plurality of candidate trajectories for the ego-vehicle;
   for each of the candidate trajectories of the ego-vehicle:
      determining a nominal trajectory prediction that comprises a nominal trajectory that the moving actor would be expected to follow in reaction to past actions of the ego-vehicle,
      determining a reactive trajectory that the moving actor is expected to follow in reaction to the candidate trajectory of the ego-vehicle,
      determining a cost to the moving actor for the reactive trajectory, wherein the cost to the moving actor is a function of a lateral offset of the reactive trajectory from the nominal trajectory and a distance along a curve of a deviation of the reactive trajectory from the nominal trajectory, and
      determining a candidate trajectory cost for the candidate trajectory, wherein the candidate trajectory cost is a function of a cost to the moving actor for the reactive trajectory and one or more ego-centric factors;
   using the candidate trajectory costs for the candidate trajectories to select one of the candidate trajectories via which to move the ego-vehicle; and
   by an autonomous vehicle system of the ego-vehicle, moving the ego-vehicle in the environment along the selected trajectory.

2. The method of claim 1, wherein using the candidate trajectory costs for the candidate trajectories to select one of the candidate trajectories comprises selecting the candidate trajectory having the lowest candidate trajectory cost.

3. The method of claim 1, wherein using the candidate trajectory costs for the candidate trajectories to select one of the candidate trajectories comprises selecting, from the candidate trajectories, a trajectory having a lowest cost to the moving actor.

4. The method of claim 1, wherein the cost to the moving actor is a function of either or both of the following:
   severity of a control action associated with the reactive trajectory; or
   how close the reactive trajectory will come to the candidate trajectory.

5. The method of claim 1, wherein determining the reactive trajectory that the moving actor is expected to follow in reaction to the candidate trajectory of the ego-vehicle comprises:
   determining a plurality of possible reactive trajectories that the moving actor may follow in reaction to the candidate trajectory;
   determining a reactive trajectory cost for each of the possible reactive trajectories; and
   selecting, as the reactive trajectory that the moving actor is expected to follow, the possible reactive trajectory having the lowest reactive trajectory cost.

6. The method of claim 1, wherein determining the candidate trajectory costs for the candidate trajectories is performed by a motion planning system of the ego-vehicle.

7. The method of claim 1, wherein determining the candidate trajectory costs for the candidate trajectories is performed by an external system that is in communication with the ego-vehicle.

8. A system for determining a trajectory for autonomous vehicle, the system comprising:
   a presence detection system that is capable of detecting presence of a moving actor in an environment while the ego-vehicle is moving about the environment;
   a processor; and
   a memory containing programming instructions that are configured to cause the processor to:
      identify a plurality of candidate trajectories for the ego-vehicle,
      for each of the candidate trajectories of the ego-vehicle:
         determine a nominal trajectory prediction that comprises a nominal trajectory that the moving actor would be expected to follow in reaction to past actions of the ego-vehicle;
         determine a reactive trajectory that the moving actor is expected to follow in reaction to the candidate trajectory of the ego-vehicle;
         determine a cost to the moving actor for the reactive trajectory, wherein the cost to the moving actor is a function of a lateral offset of the reactive trajectory from the nominal trajectory and a distance along a curve of a deviation of the reactive trajectory from the nominal trajectory; and
         determine a candidate trajectory cost for the candidate trajectory, wherein the candidate trajectory cost is a function of a cost to the moving actor for the reactive trajectory and one or more ego-centric factors, and
      use the candidate trajectory costs for the candidate trajectories to select one of the candidate trajectories via which to move the ego-vehicle, and
      cause an autonomous vehicle system of the ego-vehicle to move the ego-vehicle in the environment along the selected trajectory.

9. The system of claim 8, further comprising the autonomous vehicle system of the ego-vehicle, wherein the autonomous vehicle system comprises an onboard computing device and programming that is configured to cause the ego-vehicle to move along the selected trajectory.

10. The system of claim 8, wherein the presence detection system comprises one or more of the following: a camera or a LiDAR system.

11. The system of claim 8, wherein the instructions to use the candidate trajectory costs for the candidate trajectories to select one of the candidate trajectories comprise instructions to select the candidate trajectory having the lowest candidate trajectory cost.

12. The system of claim 8, wherein the instructions to use the candidate trajectory costs for the candidate trajectories to select one of the candidate trajectories comprise instructions to select, from the candidate trajectories, a trajectory having a lowest cost to the moving actor.

13. The system of claim 8, wherein the cost to the moving actor is a function of either or both of the following:
   severity of a control action associated with the reactive trajectory; or
   how close the reactive trajectory will come to the candidate trajectory.

14. The system of claim 8, wherein the instructions to determine the reactive trajectory that the moving actor is expected to follow in reaction to the candidate trajectory of the ego-vehicle comprise instructions to:
   determine a plurality of possible reactive trajectories that the moving actor may follow in reaction to the candidate trajectory;
   determine a reactive trajectory cost for each of the possible reactive trajectories; and
   select, as the reactive trajectory that the moving actor is expected to follow, the possible reactive trajectory having the lowest reactive trajectory cost.

15. The system of claim 8, wherein the processor is a component of a motion planning system of the ego-vehicle.

16. The system of claim 8, wherein the processor is a component of an external system that is in communication with the ego-vehicle.

17. A method of determining a trajectory for an autonomous vehicle, the method comprising:
   by a presence detection system of an ego-vehicle, detecting presence of a moving actor in an environment while the ego-vehicle is moving about the environment;
   identifying a plurality of candidate trajectories for the ego-vehicle;
   for each of the candidate trajectories of the ego-vehicle:
      determining a reactive trajectory that the moving actor is expected to follow in reaction to the candidate trajectory of the ego-vehicle,
      determining a nominal trajectory prediction that comprises a nominal trajectory that the moving actor would be expected to follow in reaction to past actions of the ego-vehicle,
      determining a cost to the moving actor for the reactive trajectory, wherein the cost to the moving actor is a function of a lateral offset of the reactive trajectory from the nominal trajectory and a distance along a curve of a deviation of the reactive trajectory from the nominal trajectory, and
      determining a candidate trajectory cost for the candidate trajectory, wherein the candidate trajectory cost is a function of a cost to the moving actor for the reactive trajectory and one or more ego-centric factors;
   selecting, from the candidate trajectories, a candidate trajectory having the lowest cost; and
   by an autonomous vehicle system of the ego-vehicle, moving the ego-vehicle in the environment along the selected candidate trajectory.

18. The method of claim 17, wherein the cost to the moving actor is a function of either or both of the following:
   severity of a control action associated with the reactive trajectory; or
   how close the reactive trajectory will come to the candidate trajectory.

* * * * *